April 9, 1929.  A. LEIB  1,708,546

APPARATUS FOR VARYING ELECTRICAL VALUES

Filed March 26, 1923

Inventor
AUGUST LEIB
By his Attorney

Patented Apr. 9, 1929.

1,708,546

UNITED STATES PATENT OFFICE.

AUGUST LEIB, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

APPARATUS FOR VARYING ELECTRICAL VALUES.

Application filed March 26, 1923, Serial No. 627,829, and in Germany April 22, 1922.

The present invention relates to an apparatus for varying electrical values such as resistances, capacities, self-inductions, etc., the apparatus being provided with an adjusting element by means of which its adjustment to certain points or parts of its range of variations is automatically prevented. The adjusting element may, for instance, be so provided that the transmission of drive therefrom to the movable part of the apparatus to be varied is periodically prevented depending on the setting of the apparatus.

Figure 1:
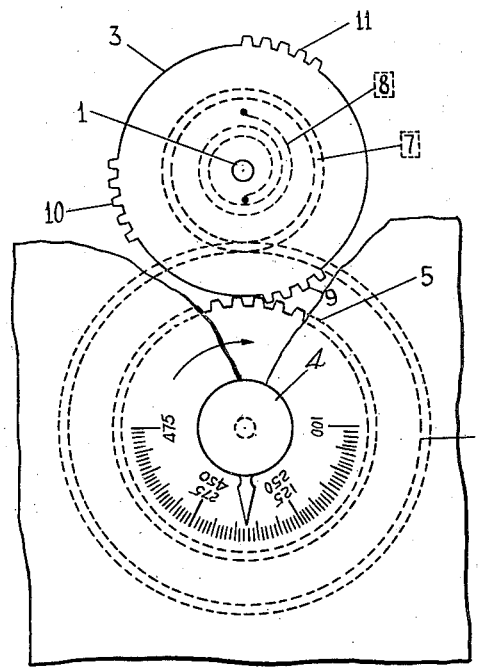
Fig. 1 is a view in elevation of apparatus embodying the invention.
Figure 2:
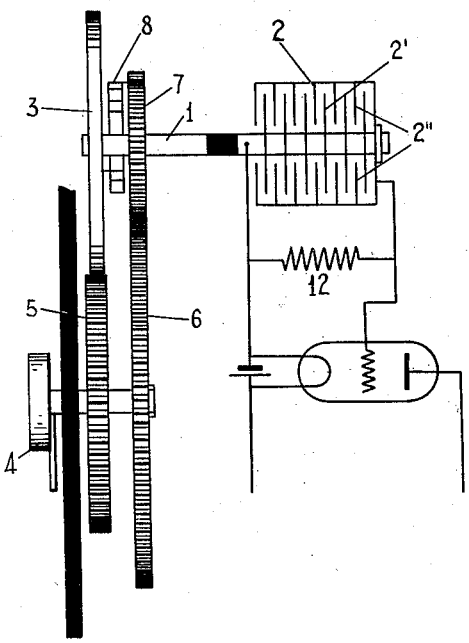
Fig. 2 is a view in elevation looking from the right in Fig. 1 and showing diagrammatically a circuit arrangement including the apparatus.

In the illustrated construction, the shaft 1 of a variable condenser 2 has fixed thereon a toothed wheel 3 which may be driven by a gear 5 connected with a knob 4. A second gear 6 connected with the knob 4 engages another gear 7 loosely mounted on the shaft 1. A spring 8 is provided between the gear 7 and the toothed wheel 3 and is placed under tension upon the rotation of the gear 5 and toothed wheel 3 in opposite directions. The wheel 3 is not provided with teeth all around its periphery but has toothed segments 9, 10 and 11 which are separated from each other by unbroken segments.

The arrangement operates as follows, assuming that the segment 9 is in mesh with the gear 5: When the knob 4 is rotated in the direction of the arrow, the movable plates 2' of the condenser 2 will be displaced with relation to the stationary plates 2". The closer setting of the device within the width of the toothed segment 9 may thus be accomplished. Under the control of the gear 6, the gear 7 will be rotated and due to the greater difference in ratio between the diameters of the gears 6 and 7 as compared with the ratio between the diameters of the gear 5 and the toothed wheel 3, the gear 7 will be rotated faster than the toothed wheel 3 and will place the spring 8 under tension. As soon, however, as the last tooth of the segment 9 leaves the gear 5, the spring 8 will rapidly turn the wheel 3 and consequently the movable plates 2' of the condenser 2 until the first tooth of the segment 10 engages the gear 5. Adjustment within the width of the segment 10 may then be accomplished. It will be seen, however, that the device cannot be adjusted by manipulation of the knob 4 within the range corresponding to the unbroken segment between toothed segments 9 and 10.

The ranges within which adjustment is prevented are not indicated on the scale which is provided on the apparatus, for example, on the periphery of the knob 4 as indicated at 4', and the ranges within which adjustment may be accomplished follow each other on the scale. The arrangement may also be so provided that the shaft 1 will not be caused to continue its rotation when its drive is rendered ineffective but will remain stationary upon the further rotation of the knob 4 during the non-adjustable ranges and at the end of this range will be caused to continue its rotation. This may be accomplished by means of a pawl arrangement which is automatically thrown in and out. The scale 4' will be uniformly continuous.

Obviously the driving mechanism may consist of elements other than toothed wheels or gears.

The apparatus may be used for a variety of purposes. It is of particular advantage when applied to wave varying means in wireless telegraphy and telephony. Accordingly, the apparatus represented in the drawings consists of a variable condenser 2 in an oscillating circuit comprising also a self-induction 12. The provision of the invention in such oscillating circuit arrangements for senders or receivers, makes it possible to prevent operation of the arrangements over certain portions of the wave length range of the wave varying means. Furthermore, the device has the great advantage that it will obviate the necessity of interrupting or short-circuiting oscillating or other circuits.

Although the invention is hereinbefore described as embodied in a variable condenser, it is recognized that the invention is not limited thereto and that it may be embodied in apparatus of various kinds for introducing varying electrical values into an electric circuit.

Having described my invention, what I claim is:

1. In an apparatus of the class described, a device for introducing varying electrical values into an electric circuit throughout a predetermined range, means for adjusting said device over certain portions of its range of values, and means for operating said device over certain other portions of its range of values independently of control by the adjusting means.

2. In an apparatus of the class described, a device comprising relatively movable parts and operable to introduce varying electrical values into an electric circuit throughout a predetermined range and means for adjusting said device comprising a wheel connected with a movable part of the device and having certain of the segments of its periphery toothed and the other intermediate segments devoid of teeth, a gear for operating said device when the teeth of the gear are enmeshed with a toothed segment of the wheel and means separate from said gear for rapidly moving said device over the ranges of values corresponding with the portions of the toothed wheel which are not provided with teeth.

3. In an apparatus of the class described, a device for introducing varying electrical values into an electric circuit and means for varying the value of said device comprising a wheel having toothed segments on its periphery separated from each other by smooth portions not provided with teeth, a driving gear arranged for meshing engagement with the toothed segments of the wheel, and means energized by the driving gear for operating said device without substantial additional movement of the driving gear over the portion of the range of the device corresponding to the smooth portions of the periphery of the toothed wheel.

4. In an apparatus of the class described, a device for introducing varying electrical values into an electric circuit, said device including a movable part and a shaft upon which said part is mounted and means for adjusting said device comprising a loosely mounted gear, a toothed wheel operatively connected to the shaft, a second gear arranged for meshing engagement with said loose gear, a third gear operatively connected with said second gear and arranged to mesh with the teeth on said toothed wheel, said toothed wheel being provided with toothed segments separated by unbroken portions devoid of teeth, a spring for connecting said loose gear with said toothed wheel, the ratio of the diameter of the third gear to the diameter of the toothed wheel being less than the ratio of the diameter of the second gear to said loose gear, so that upon rotation of the second and third gears the loose gear is moved more rapidly than the toothed wheel, whereby the spring is put under tension and causes rapid rotation of the toothed wheel and said device upon the passing of one of the toothed segments on the toothed wheel out of mesh with said second gear, to bring another toothed segment of the wheel into mesh with said third gear.

5. In an apparatus of the class described, a device for introducing varying electrical values into an electric circuit, said device comprising a movable part and a shaft upon which said part is mounted and means for adjusting said device comprising a gear loosely mounted on said shaft, a toothed wheel fixed to the shaft, a spring connecting the gear with said toothed wheel, a second gear meshing with said loose gear, a third gear operatively connected with said second gear and arranged for meshing engagement with the toothed wheel, said wheel being provided with toothed segments separated by portions not provided with teeth and the ratio of the diameter of said third gear to the diameter of the toothed wheel being less than the ratio of the diameter of the second gear to the diameter of the loose gear, so that upon operation of the second and third gears, the device may be adjusted over portions of its range corresponding to the toothed portions of the wheel and will be moved rapidly and independently of further motion of the adjusting means over other portions of its range by said spring.

6. In an apparatus of the class described, a device for introducing varying electrical values into an electric circuit throughout a predetermined range, means for adjusting said device over certain predetermined portions of its range of values, means for operating said device over the intervening portions of its range of values independently of control by the adjusting means, and a continuous scale associated with the adjusting means and provided with readings corresponding to those portions of the range of values of the device over which the device may be adjusted.

7. In an apparatus of the class described, a device for introducing varying electrical values into an electric circuit throughout a predetermined range, said device including relatively movable parts, a member for operating one of said parts, an interrupted gearing device connecting said part and said operating member for adjusting said device throughout certain portions of the range of movement of the part and means for causing the part to be moved rapidly throughout an intermediate portion of its range of movement without appreciable movement of the operating member, and a scale associated with said operating member and provided with readings corresponding to the portions of the range of movement of said part over which it may be adjusted by the operating member.

8. In an apparatus of the class described, means for introducing a variable electrical value into an electric circuit, means for varying said first mentioned means to vary the electrical value through a given range, and automatic means for preventing adjustment of the first mentioned means over a predetermined portion of said range.

9. In a variable condenser, means for varying the capacity of the condenser through a given range, and automatic means for preventing adjustment of the condenser by said first mentioned means over a predetermined portion of its capacity range.

10. A variable tuning element, comprising in combination, a movable member, means for moving said member through a given range, means for preventing adjustment of said member over a portion of said range, and continuously marked indicating means for indicating the position of said movable member when in an adjusted position only.

11. A variable tuning element comprising in combination, a movable member, means for adjusting said member through a certain portion of its range, means for preventing adjustment over another portion of its range, but allowing movement thereover, and continuously marked indicating means for indicating the position of said movable member when in an adjusted position only.

AUGUST LEIB.